(12) United States Patent
Nishiyama

(10) Patent No.: US 11,939,088 B2
(45) Date of Patent: Mar. 26, 2024

(54) SATELLITE VISIBILITY ASSIGNMENT DEVICE, SATELLITE OPERATION SYSTEM, VISIBILITY ASSIGNMENT METHOD, AND RECORDING MEDIUM STORING PROGRAM

(71) Applicant: Mitsubishi Electric Corporation, Tokyo (JP)

(72) Inventor: Takehiro Nishiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 176 days.

(21) Appl. No.: 17/762,089

(22) PCT Filed: Sep. 26, 2019

(86) PCT No.: PCT/JP2019/037780
§ 371 (c)(1),
(2) Date: Mar. 21, 2022

(87) PCT Pub. No.: WO2021/059424
PCT Pub. Date: Apr. 1, 2021

(65) Prior Publication Data
US 2022/0340310 A1 Oct. 27, 2022

(51) Int. Cl.
*B64G 3/00* (2006.01)
*H04B 7/185* (2006.01)

(52) U.S. Cl.
CPC .............. *B64G 3/00* (2013.01); *H04B 7/1851* (2013.01)

(58) Field of Classification Search
CPC ................................ B64G 3/00; H04B 7/1851
See application file for complete search history.

(56) References Cited

U.S. PATENT DOCUMENTS 6,272,316 B1 * 8/2001 Wiedeman ......... H04B 7/18539
455/12.1
2009/0179796 A1 * 7/2009 Chen ....................... G01S 19/28
342/357.44
(Continued)

FOREIGN PATENT DOCUMENTS

JP 2001-233300 A 8/2001
JP 2010-208599 A 9/2010
(Continued)

OTHER PUBLICATIONS

International Search Report and Written Opinion dated Nov. 5, 2019, received for PCT Application PCT/JP2019/037780, Filed on Sep. 26, 2019, 8 pages including English Translation.
(Continued)

*Primary Examiner* — Seth A Silverman
(74) *Attorney, Agent, or Firm* — XSENSUS LLP

(57) ABSTRACT

A satellite visibility assignment device (1) includes a visibility unit setter (21), a visibility unit selector (22), and an optimization calculator (23). The visibility unit setter (21) sets visibility units each including a combination of a satellite and a station to communicate with the satellite, a lower limit of a visibility start time, and an upper limit of a visibility end time. The optimization calculator (23) determines whether the visibility start time and the visibility end time are settable for each of the one or more combinations of the visibility units within a range satisfying a set constraint and calculates the visibility start time and the visibility end time through an optimization calculation. The visibility unit selector (22) selects, from the combinations of the visibility units, a combination of the visibility units to be used based on determination of the optimization calculator (23).

20 Claims, 11 Drawing Sheets

(56) References Cited

U.S. PATENT DOCUMENTS

| | | | |
|---|---|---|---|
| 2014/0100781 A1* | 4/2014 | Venkatraman | G01S 19/396 |
| | | | 701/538 |
| 2017/0192095 A1* | 7/2017 | Jobanputra | H04B 7/18517 |
| 2018/0031708 A1* | 2/2018 | Porretta | B64G 3/00 |

FOREIGN PATENT DOCUMENTS

| | | |
|---|---|---|
| JP | 2013-42409 A | 2/2013 |
| JP | 2018-171951 A | 11/2018 |

OTHER PUBLICATIONS

Extended European Search Report dated Aug. 22, 2022 in corresponding European Patent Application No. 19947364.6, 7 pages.
Cho, Doo-Hyun et al.; "Optimization-Based Scheduling Method for Agile Earth-Observing Satellite Constellation"; Nov. 1, 2018; Journal of Aerospace Information Systems, vol. 15, No. 11, pp. 611-626, 16 pages.
Office Action dated Jan. 23, 2024, issued for the corresponding EP patent application No. 19947364.6, 5 pages.

* cited by examiner

FIG.4

VISIBILITY INFORMATION

| No | SATELLITE | STATION | | START TIME | END TIME |
|---|---|---|---|---|---|
| 1 | 6-1 | 3-1 | YEAR A1 MONTH B1 DAY C1 | 00:05 | 00:15 |
| 2 | 6-1 | 3-2 | | 00:10 | 01:05 |
| 3 | 6-1 | 3-2 | | 01:45 | 02:30 |
| 4 | 6-2 | 3-1 | | 01:20 | 01:30 |
| 5 | 6-2 | 3-2 | | 01:00 | 01:50 |

FIG.5

VISIBILITY INFORMATION

| SATELLITE | STATION | TIME FROM 00:00 TO 02:30 (YEAR A1, MONTH B1, DAY C1) |
|---|---|---|
| 6-1 | 3-1 | 1 (CONFLICT) |
| | 3-2 | 2, 3 |
| 6-2 | 3-1 | 4 (CONFLICT) |
| | 3-2 | 5 (CONFLICT) |

FIG.6

VISIBILITY INFORMATION

| No | SATELLITE | STATION | YEAR A1 MONTH B1 DAY C1 | START TIME ts0 | END TIME te0 |
|---|---|---|---|---|---|
| 1 | 6-1 | 3-1 | | 00:00 | 00:40 |
| 2 | 6-1 | 3-2 | | 00:15 | 00:25 |

FIG.7

VISIBILITY INFORMATION

| SATELLITE | STATION | TIME FROM 00:00 TO 01:00 (YEAR A1, MONTH B1, DAY C1) |
|---|---|---|
| 6-1 | 3-1 | 1 (00:00 – 00:40) |
| | 3-2 | 2 (00:15 – 00:25) |

VISIBILITY UNIT LIST

| VISIBILITY UNIT | SATELLITE | STATION | YEAR A1 MONTH B1 DAY C1 | START TIME ts0 | END TIME te0 | REPRESENTATIVE TIME |
|---|---|---|---|---|---|---|
| s(1-1) | 6-1 | 3-1 | | 00:00 | 00:40 | 00:10 |
| s(1-2) | 6-1 | 3-1 | | 00:00 | 00:40 | 00:30 |
| s(2) | 6-1 | 3-2 | | 00:15 | 00:25 | 00:20 |

| VISIBILITY UNIT | SATELLITE | STATION | | START TIME ts0 | END TIME te0 | REPRESENTATIVE TIME |
|---|---|---|---|---|---|---|
| s(1-1) | 6-1 | 3-1 | YEAR A1 MONTH B1 DAY C1 | 00:00 | 00:10 | 00:10 |
| s(2) | 6-1 | 3-2 | | 00:15 | 00:25 | 00:20 |
| s(1-2) | 6-1 | 3-1 | | 00:30 | 00:40 | 00:30 |

SATELLITE VISIBILITY ASSIGNMENT DEVICE, SATELLITE OPERATION SYSTEM, VISIBILITY ASSIGNMENT METHOD, AND RECORDING MEDIUM STORING PROGRAM

CROSS-REFERENCE TO RELATED APPLICATION

The present application is based on PCT filing PCT/JP2019/037780, filed Sep. 26, 2019, the entire contents of which is incorporated herein by reference.

TECHNICAL FIELD

The present disclosure relates to a satellite visibility assignment device, a satellite operation system, a visibility assignment method, and a recording medium storing a program.

BACKGROUND ART

Tracking control operations include tracking orbiting satellites, monitoring the states of the satellites, and transmitting and receiving data to and from the satellites. The tracking control operations are performed with antennas at ground stations and data relay satellites (hereafter collectively referred to as stations) in geostationary orbit. The satellites and the stations are normally not in one-to-one correspondence. Multiple stations are used in the tracking control operations for multiple satellites. The satellites and the stations can communicate with each other in time slots referred to as visibility times or simply visibility. The visibility times change depending on, for example, the satellite orbit conditions. Thus, satellites to be operated and stations to be used to operate the satellites, as well as the times to use the stations are determined either daily or as appropriate. This is referred to as visibility assignment.

More satellites operating concurrently increase overlapping visibility time slots between multiple satellites. Visibility assignment is useful for more efficient operations.

A known visibility assignment device responding to this issue uses a process sequence table generated based on a table specifying the priority level of the station and the priority level of the satellite for each station, and performs visibility assignment in the order specified in the process sequence table to avoid overlaps between the visibility times (see, for example, Patent Literature 1).

Another known visibility assignment device optimizes visibility assignment by repeating an operation of switching visibility selection and stochastically determining whether to change the visibility to the solution resulting from the switching operation with annealing, or one of metaheuristics (see, for example, Patent Literature 2).

CITATION LIST

Patent Literature

Patent Literature 1: Unexamined Japanese Patent Application Publication No. 2010-208599
Patent Literature 2: Unexamined Japanese Patent Application Publication No. 2013-042409

SUMMARY OF INVENTION

Technical Problem

The visibility assignment device described in Patent Literature 1 may assign more visibility to some satellites depending on the settings of the priority levels, and may cause inefficient assignment. The visibility assignment device described in Patent Literature 2 uses fixed visibility time for assignment and thus cannot perform assignment when visibility times overlap. This may cause inefficient assignment.

An objective of the present disclosure is to perform efficient visibility assignment without assigning more visibility to some satellites.

Solution to Problem

To achieve the above objective, a satellite visibility assignment device according to an aspect of the present disclosure includes a visibility unit setter, a visibility unit selector, and an optimization calculator. The visibility unit setter sets, based on visibility information, visibility units each including a combination of one or more satellites and one or more stations to communicate with the one or more satellites, a lower limit of a visibility start time, and an upper limit of a visibility end time. The visibility unit selector sets one or more combinations of the visibility units set by the visibility unit setter. The optimization calculator determines whether the visibility start time and the visibility end time are settable for each of the one or more combinations of the visibility units within a range satisfying at least one constraint of a visibility time, a visibility interval, the lower limit of the visibility start time, or the upper limit of the visibility end time, and calculates the visibility start time and the visibility end time through an optimization calculation when the visibility start time and the visibility end time are settable. The visibility unit selector selects, from the set combinations of the visibility units, a combination of the visibility units to be used based on determination of the optimization calculator as to whether the visibility start time and the visibility end time are settable and based on the visibility start time and the visibility end time set when the visibility start time and the visibility end time are determined to be settable.

Advantageous Effects of Invention

The visibility assignment device with the above configuration selects a combination of the visibility units to be used based on the determination performed for each combination of the visibility units as to whether the visibility start time and the visibility end time are settable and based on the visibility start time and the visibility end time set through an optimization calculation. The visibility assignment device can thus perform efficient assignment by using the visibility time effectively.

BRIEF DESCRIPTION OF DRAWINGS

FIG. 4 is a table showing first example visibility information provided to the visibility assignment device illustrated in FIG. 3;

FIG. 5 is a time chart showing the same items in FIG. 4;

FIG. 6 is a table showing second example visibility information provided to the visibility assignment device illustrated in FIG. 3;

FIG. 7 is a time chart showing the same items in FIG. 6;

DESCRIPTION OF EMBODIMENTS

A satellite visibility assignment device, a satellite operation system, a visibility assignment method, and a program according to an embodiment of the present disclosure are described with reference to the drawings. In the embodiment described below, the same components are given the same reference symbols. Multiple components such as data relay satellites 4-1 to 4-4 may be referred to as, for example, data relay satellites 4 or a data relay satellite 4-*i* without being specified as individual components.

Figure 1:
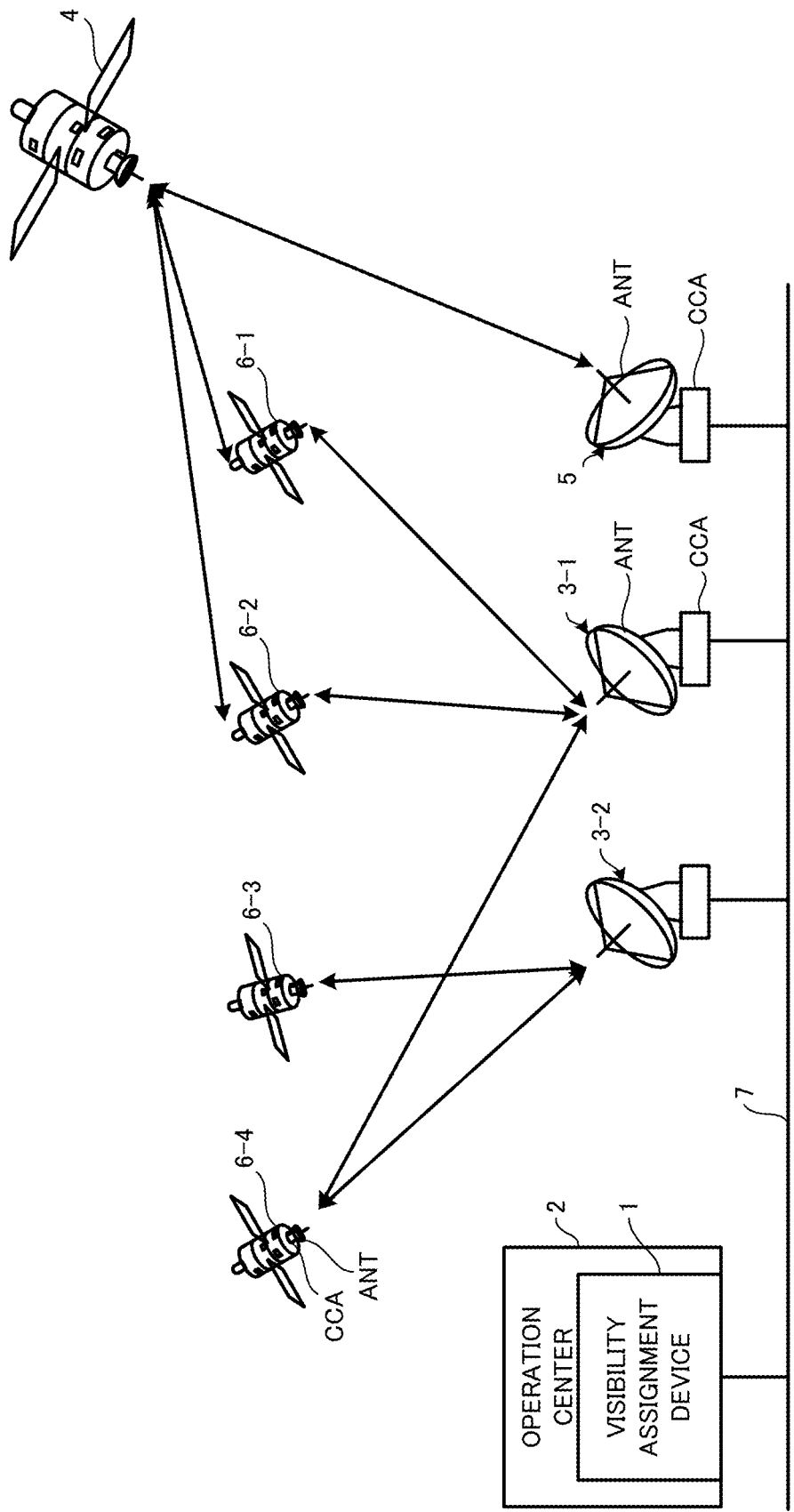
FIG. 1 is a diagram of a satellite operation system including a visibility assignment device according to an embodiment of the present disclosure.

FIG. 1 is a diagram of a satellite operation system 100 including a visibility assignment device 1 according to the embodiment.

As illustrated in FIG. 1, the satellite operation system 100 includes an operation center 2 at which the visibility assignment device 1 is installed, ground stations 3, a data relay satellite 4, a data relay satellite control station 5, and satellites 6 to be operated.

The ground stations 3, the data relay satellite 4, and the data relay satellite control station 5 each include an antenna ANT including, for example, a parabolic antenna and a communication control apparatus CCA that controls the antenna ANT. The ground stations 3 and the data relay satellite 4 may be collectively referred to as stations 3 and 4.

The visibility assignment device 1, the ground stations 3, and the data relay satellite control station 5 are connected with a network 7 to communicate with each other.

In FIG. 1, the satellite operation system 100 may include any number of satellites 6. Although two ground stations 3-1 and 3-2 are illustrated, the satellite operation system 100 may include any number of ground stations, such as one or three or more ground stations. Similarly, the satellite operation system 100 may include any numbers of data relay satellites 4 and data relay satellite control stations 5.

The satellite operation system 100 stores orbit data used to calculate the orbits of the satellites 6 and the data relay satellite 4 and position information about the ground stations 3 in a storage 13 (described in detail later) in the visibility assignment device 1. The position information about the ground stations 3 is, for example, position data indicating the latitude and the longitude.

The network 7 includes an Internet line, a dedicated communication line, a virtual private network (VPN), a local area network (LAN), a communication cable, or a combination of any two or more of these to transmit data. The network 7 may include a wireless communication line alone, a wired communication line alone, or a combination of a wireless communication line and a wired communication line.

The visibility assignment device 1 assigns visibility times of the ground stations 3 and the data relay satellite 4 to one or more satellites 6 to be operated. The visibility time refers to a time slot defined as a period from a visibility start time (hereafter referred to as an acquisition-of-signal or AOS time) to a visibility end time (hereafter referred to as a loss-of-signal or LOS time) during which communication is possible between each satellite 6 and corresponding stations 3 and 4.

The visibility assignment device 1 transmits the result of visibility assignment to the ground stations 3 and the data relay satellite control station 5. The data relay satellite control station 5 transmits the received result of visibility assignment to the data relay satellite 4.

The ground stations 3 each drive, based on the received result of visibility assignment, the antenna during the visibility time slot (time slot from the AOS time to the LOS time) for each satellite 6 to be operated to track the satellite 6.

The data relay satellite 4 also drives, based on the result of visibility assignment received from the data relay satellite control station 5, the antenna installed on the data relay satellite 4 during the visibility time slot (time slot from the AOS time to the LOS time) for each satellite 6 to be operated to track the satellite 6.

The antennas in the ground stations 3 and the data relay satellite 4 are oriented toward any of the satellites 6 at the corresponding time as viewed from the antenna positions. The orientations can be calculated from the driving time and the orbit information about the satellites 6. Thus, the ground stations 3 and the data relay satellite 4 can automatically drive the antennas based on the results of visibility assignment output from the visibility assignment device 1.

Each satellite 6 performs operations, such as command transmission and data reception, in the assigned visibility time through the ground stations 3 and the data relay satellite 4. Each satellite 6 may be operated by the operation center 2, or one or more other operation centers (not illustrated). In either case, the result of visibility assignment is transmitted or received through the network 7 in the satellite operation system 100, which enables the operation of the satellites 6 within the range of the assigned visibility times.

In the illustrated example, the operation center 2, the ground stations 3, and the data relay satellite control station 5 are located at different positions and connected with the network 7, but one or more of the operation center 2, the ground stations 3, and the data relay satellite control station 5 may be located at the same position. For example, one of the ground stations 3 may also serve as the operation center 2.

Figure 2:
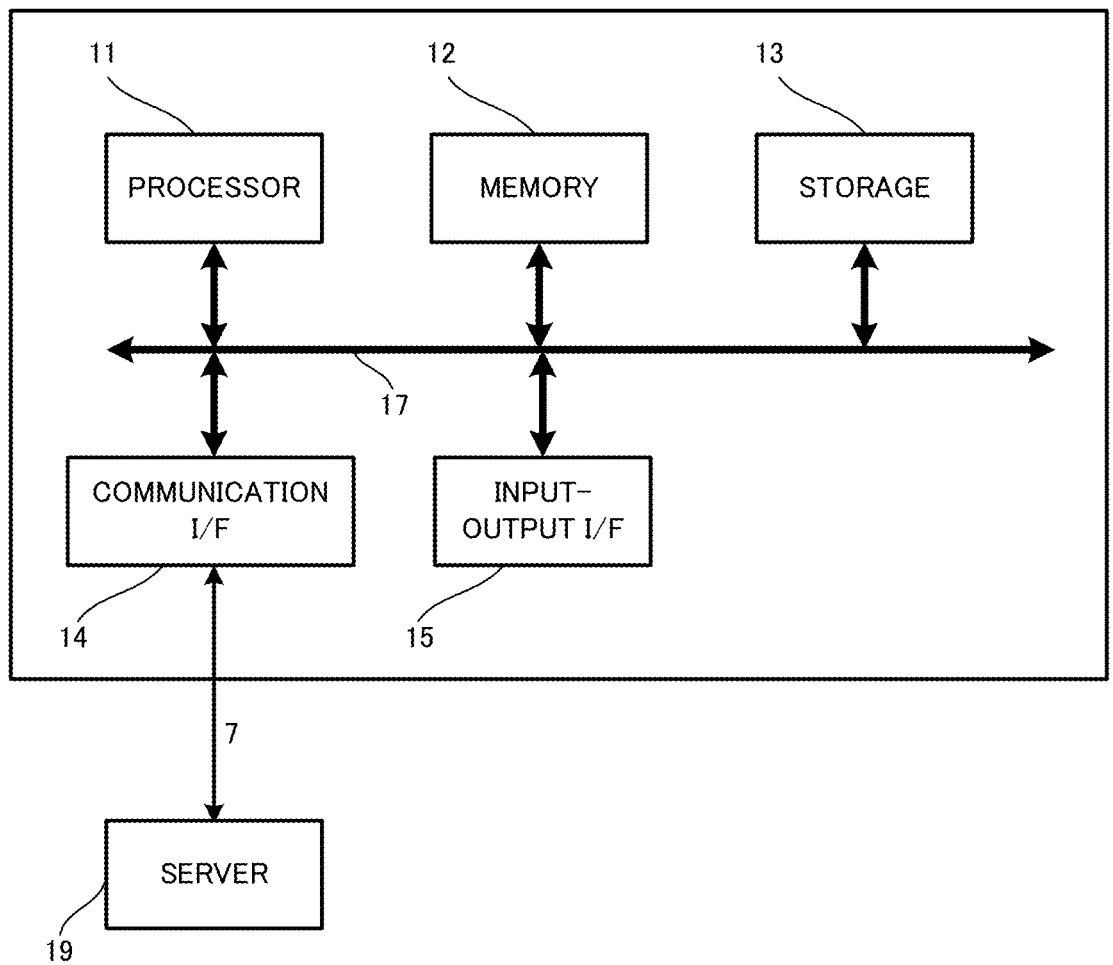
FIG. 2 is a diagram illustrating a hardware configuration of the visibility assignment device illustrated in FIG. 1.

The configuration of the visibility assignment device 1 is described with reference to FIG. 2.

The visibility assignment device 1 is implemented by a computer, and includes, as hardware components, a processor 11 that performs processes, a memory 12 that functions as a work area for the processor 11, a storage 13 that serves as an example of a non-transitory recording medium that stores programs executable by the processor, a communication interface (I/F) 14 that communicates with an external device, and an input-output interface (I/F) 15 that inputs and outputs data.

The processor 11 executes a program stored in the storage 13 by loading the program into the memory 12 and executing the program to perform visibility assignment described later. The program executed by the processor 11 is installed in the storage 13 and loaded into the memory 12 as appropriate.

The memory 12 includes, for example, a random-access memory (RAM), and functions as a work area for the processor 11.

The storage 13 includes a nonvolatile storage medium such as a read-only memory (ROM), a hard disk device, or a solid-state drive (SSD), and stores a visibility assignment plan designing program installed for execution by the processor 11. The program is loaded into the memory 12 and executed by the processor 11. The storage 13 stores visibility information and visibility assignment conditions (described later in detail). When the storage 13 does not store visibility information or visibility assignment conditions, the processor 11 loads those data items from, for example, an external server 19 connected to the processor 11 with the communication interface 14, and stores the data items into the storage 13. The storage 13 stores the visibility assignment result generated by the visibility assignment device 1.

The communication interface (I/F) 14 transmits and receives data to and from an external device through the network 7. For example, the communication interface (I/F) 14 receives visibility information and visibility assignment conditions from the server 19, and transmits the visibility assignment result generated by the visibility assignment device 1 to, for example, the ground stations 3 and the data relay satellite 4.

The input-output interface (I/F) 15 is connected to external devices such as a display, a keyboard, a mouse, and a universal serial bus (USB) to receive, for example, operations on the keyboard and the mouse performed by an operator of the satellite operation system 100 and receive data loaded from an attached storage medium. The input-output interface 15 is also used as an interface to display or output, for the operator, data indicating a designed visibility assignment plan, for example, on a display or to a printer (not illustrated). The input-output interface 15 is also used to allow writing of data into an attached storage medium.

Figure 3:
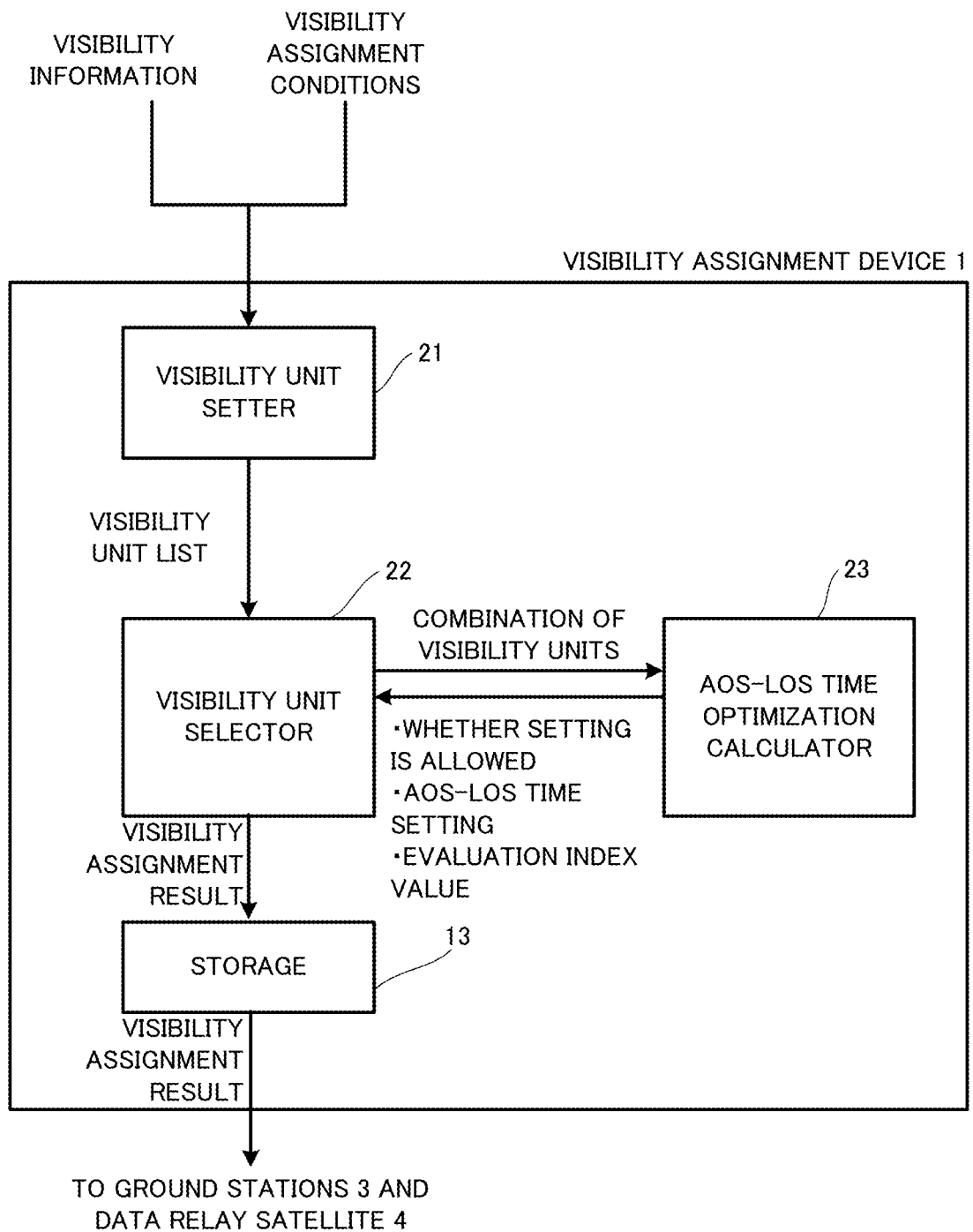
FIG. 3 is a diagram illustrating a functional configuration of the visibility assignment device illustrated in FIG. 2.

As illustrated in FIG. 3, the visibility assignment device 1 with the above configuration includes, as functional components, a visibility unit setter 21, a visibility unit selector 22, and an AOS-LOS time optimization calculator 23 that optimizes the AOS time and the LOS time. These components are implemented with the visibility assignment plan designing program and stored in the storage 13. The visibility assignment plan designing program is loaded and executed by the processor 11 using the memory 12 as a working memory.

The visibility unit setter 21 sets at least one visibility unit based on the visibility information and the visibility assignment conditions input into the visibility assignment device 1. In the present embodiment, the visibility unit is acquired by adding appropriate information to each visibility time included in the visibility information.

The visibility unit selector 22 sets one or more combinations of the visibility units using all the visibility units set by the visibility unit setter 21, and notifies the AOS-LOS time optimization calculator 23 of the combinations.

The AOS-LOS time optimization calculator 23, for each of the combinations of the visibility units, i) determines whether the AOS time and the LOS time can be set within the range in which constraints are satisfied, ii) calculates, when the times can be set, the AOS time and the LOS time through an optimization calculation, and iii) calculates evaluation index values of the calculated AOS time and LOS time. The AOS-LOS time optimization calculator 23 notifies, based on the determination result and the calculation result, the visibility unit selector 22 of i) whether the AOS time and the LOS time can be set and ii) the AOS time and the LOS time calculated through the optimization calculation and the evaluation index values when the times can be set.

The visibility unit selector 22 selects, from the combinations of the visibility units, a combination to be used based on the evaluation index values notified from the AOS-LOS time optimization calculator 23, and temporarily stores the combination into the storage 13. The communication I/F 14 in the visibility assignment device 1 transmits, as a transmitter, information indicating the combination of the visibility units to be used and stored in the storage 13 to, for example, the stations 3 and 4 that use the information and to the server 19 as appropriate.

The visibility information provided to the visibility assignment device 1 is a list of visibility times acquired from calculations, that is, visibility analysis, performed on all the combinations of the satellites 6 and the stations 3 and 4 to undergo visibility assignment. The visibility analysis is performed to calculate the visibility times based on, for example, the satellite orbits and the view field of the antennas installed on the satellites. The list contains the visibility times for the target period of the visibility assignment (for example, for one day). FIGS. 4 and 5 show example visibility information. For example, item No. 1 listed in the second row in FIG. 4 indicates that the satellite 6-1 is available for communication with the ground station 3-1 from the time 00:05 to the time 00:15.

FIG. 5 is a time chart showing the visibility information shown in the table form in FIG. 4, with time on the horizontal axis. Rectangles numbered with 1 to 5 in the figure respectively correspond to item Nos. 1 to 5 in FIG. 4. Normally, using all the visibility times indicated in the visibility information is impossible. For example, the visibility information item Nos. 1 and 2 for the satellite 6-1 overlap for five minutes from the time 00:10 to the time 00:15. Thus, during this time slot, one or both of the ground stations 3-1 and 3-2 are to be assigned to the satellite 6-1. The visibility information item Nos. 2 and 5 for the ground station 3-2 overlap for five minutes from the time 01:00 to the time 01:05. During this time slot, the ground station 3-2 can be assigned to either the satellite 6-1 or 6-2, but cannot be concurrently assigned to both.

Such an overlap between two visibility times does not allow full use of both of the visibility times. This is referred to as visibility conflict or simply conflict. In reality, when one satellite switches a communication destination between two stations (switches from the ground station 3-1 to the ground station 3-2 in this example), time is usually taken wastefully for switching. Thus, conflict may occur as well when the visibility times are simply close without overlapping each other. The same applies when one station switches a communication destination between two satellites.

The individual visibility start times and end times included in the above visibility information, for example, 00:05 and 00:15 in item No. 1 in FIG. 4, may be respectively referred to as the AOS time and the LOS time. To avoid confusion, however, these times are not referred to as the AOS time and the LOS time herein. The AOS time and the LOS time herein refer simply to times within a time range in which communication is allowed resulting from the visibility assignment.

In the present embodiment, the visibility start time is referred to as an AOS time lower limit ts0, and the visibility end time is referred to as a LOS time upper limit te0. In the present embodiment, the AOS time and the LOS time are set at times between the visibility start time and the visibility end time. Thus, the visibility start time is set to the AOS time lower limit ts0, and the visibility end time is set to the LOS time upper limit te0. When the AOS time is not to be aligned with the visibility start time due to some conditions, the AOS time lower limit ts0 may be set to a time later than the visibility start time, and the LOS time upper limit te0 may be set to a time earlier than the visibility end time. For the visibility information item No. 1 in FIG. 4, the visibility start time is aligned with the AOS time lower limit ts0 or more specifically with 00:05, and the visibility end time is aligned with the LOS time upper limit te0 or more specifically with 00:15.

The visibility unit setter 21 illustrated in FIG. 3 sets one or more visibility units based on the visibility information.

More specifically, the visibility unit setter 21 receives visibility information shown in FIGS. 4 and 5 and visibility assignment conditions corresponding to constraints to be satisfied by the visibility units. The visibility unit setter 21 determines the number Nc of visibility units generated from the received visibility information based on a visibility time T indicated by the visibility information, or more specifically, the period from the visibility start time ts0 to the visibility end time te0 and based on a threshold Tc contained in the visibility assignment conditions using the formula below.

$$Nc=\text{ceil}(T/Tc),$$

where ceil(x) indicates rounding off the number to the smallest integer greater than or equal to x.

The visibility unit setter 21 then generates Nc visibility units from the visibility information. A visibility unit s(i-k) (k=1, ... , Nc) indicates a k-th visibility unit generated from i-th visibility information item. The visibility unit s(i-k) has a representative time s(i-k).tc set using the formula below.

$$s(i\text{-}k).tc=ts0+(k-½)\times T/Nc\ (k=1,\ldots,Nc)$$

When the visibility time T is less than the threshold Tc, Nc=1, and the representative time is at the middle point tc between ts0 and te0 or tc=(ts0+te0)/2.

A specific example of setting the representative time with the visibility unit setter 21 is described with reference to the visibility information shown in FIG. 6. FIG. 7 shows the same visibility information as FIG. 6 in a different format.

In this example, the threshold Tc is set to 30 minutes.

The visibility information item No. 1 in FIG. 6 includes a visibility time T of 40 minutes from 00:00 to 00:40, and the visibility information item No. 2 includes a visibility time T of 10 minutes from 00:15 to 00:25. Thus, the number of visibility units acquired from the visibility information item No. 1 is ceil(40/30)=2, and the number of visibility units acquired from the visibility information item No. 2 is ceil(10/30)=1.

Figures 8, 9:
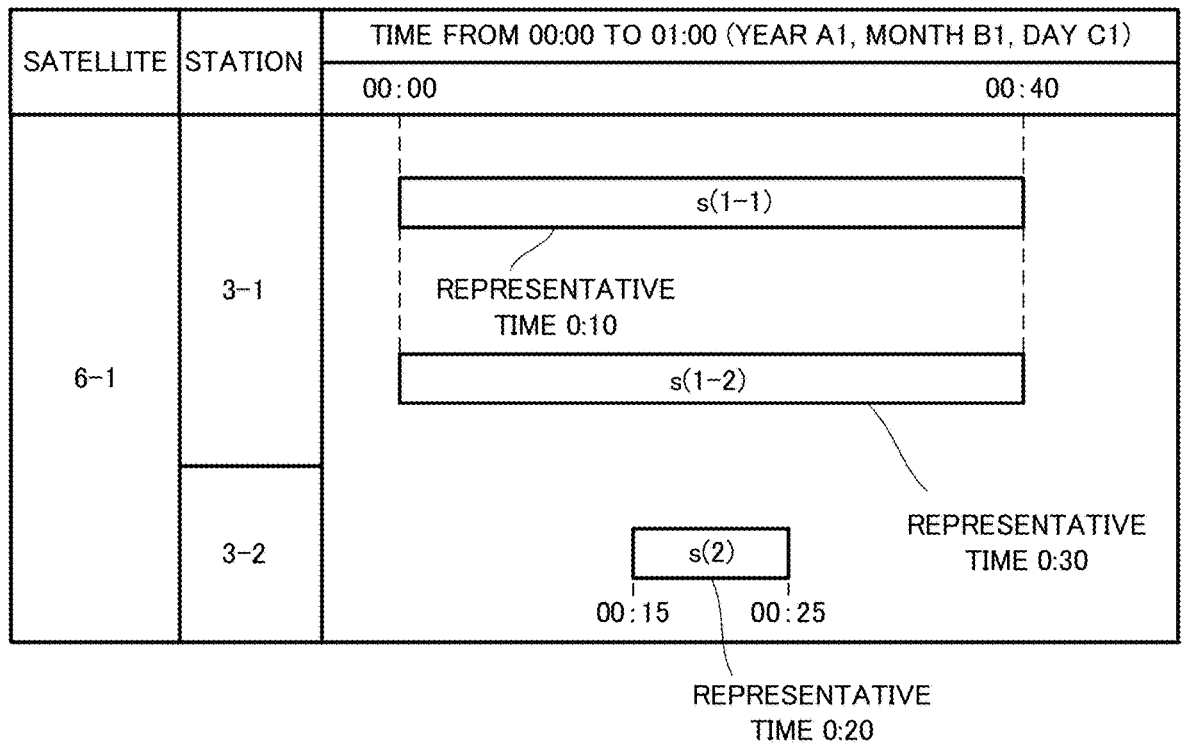
FIG. 8 is a table showing a visibility unit list generated by a visibility unit setter illustrated in FIG. 3.
FIG. 9 is a time chart showing the same items in FIG. 8.

Thus, as shown in FIGS. 8 and 9, the visibility unit setter 21 generates two visibility units s(1-1) and s(1-2) from the visibility information item No. 1 in FIG. 6. The visibility unit setter 21 calculates representative times s(1-1).tc and s(1-2).tc respectively for the generated visibility units s(1-1) and s(1-2).

For the visibility units s(1-1) and s(1-2), the visibility start time ts0 is 00:00, the visibility end time te0 is 00:40, and the visibility time T is 40 minutes.

For the visibility unit s(1-1), k=1 and Nc=2. When these values are substituted into the definition s(1-k).tc for the representative time, the representative time s(1-1).tc is 00:10. For the visibility unit s(1-2), k=2 and Nc=2. When these values are substituted into the definition s(1-k).tc for the representative time, the representative time s(1-2).tc is 00:30.

The visibility unit setter 21 generates one visibility unit s(2) from the visibility information item No. 2 in FIG. 8, and the representative time s(2).tc is 00:20.

Figures 10, 11:
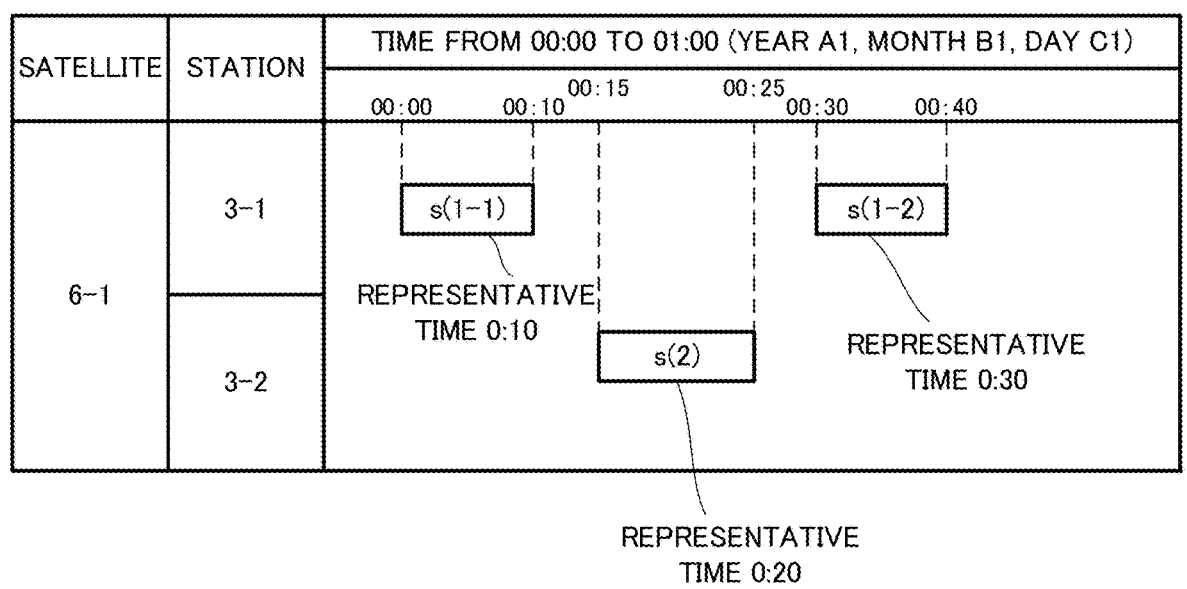
FIG. 10 is a table showing examples of visibility units generated by the visibility unit setter illustrated in FIG. 3, representative times, and visibility assignments based on the visibility units and the representative times.
FIG. 11 is a time chart showing the same items in FIG. 10.

In this manner, multiple visibility units are generated from the visibility information including the visibility time T longer than the threshold Tc, and different representative times are assigned to these visibility units. Thus, as shown in FIGS. 10 and 11, for example, the ground station 3-1 can be assigned to the satellite 6-1 from 00:00 to 00:10, the ground station 3-2 can be assigned to the satellite 6-1 from 00:15 to 00:25, and the ground station 3-1 can be assigned again to the satellite 6-1 from 00:30 to 00:40. This configuration enables flexible visibility assignment.

The visibility unit setter 21 adds appropriate attribute information to the generated visibility units to generate visibility units to be assignment candidates. In the example described below, the visibility unit is denoted with s(i), where i is a number identifying the visibility unit. The visibility unit setter 21 provides an attribute such as a satellite name or a station name to each visibility unit. In this example, these attributes are added after a dot following s(i). Attributes provided by the visibility unit setter 21 to each visibility unit are listed below.

s(i).sat: satellite identification information including a name and identification number
s(i).stn: station identification information
s(i).ts0: AOS time lower limit
s(i).te0: LOS time upper limit
s(i).r: data transmission rate
s(i).Tmin: visibility time lower limit
s(i).tc: representative time
s(i).w: weighting factor The visibility unit setter 21 sets information about the satellite and the station included in the visibility information as the satellite identification information s(i).sat and station identification information s(i).stn.

The visibility unit setter 21 sets the visibility start time indicated by the visibility information as the AOS time lower limit s(i).ts0, and the visibility end time indicated by the visibility information as the LOS time upper limit s(i).te0.

The data transmission rate s(i).r is determined in accordance with a combination of the satellite 6 to be operated and the station 3 or 4. The visibility unit setter 21 sets the attribute value based on the line speed included in the visibility assignment conditions. For example, when the speed of the line used by the satellite 6-1 to communicate with the ground station 3-1 is 100 Mbps, the data transmission rate s(i).r for the visibility units for the satellite 6-1 and the ground station 3-1 is set to 100.

The visibility time lower limit s(i).Tmin is the shortest visibility time for the visibility unit assignment. The visibility unit setter 21 sets the attribute value based on the visibility time lower limit included in the visibility assignment conditions. An excessively short visibility time assigned may cause complicated operations or failure in transmitting full data. In such a case, the visibility time T may not be used for operation. Thus, the visibility time lower limit s(i).Tmin is provided as a minimum time to be assigned to a single visibility. The visibility unit setter 21 may set the same value as a constant to all the visibility units as the visibility time lower limit s(i).Tmin, or may set a different value as the visibility time lower limit s(i).Tmin for each satellite 6 and each station 3 or 4. The visibility unit setter 21 may set different values to different visibility units as the visibility time lower limit s(i).Tmin. When the visibility time lower limit s(i).Tmin is greater than the difference between the AOS time lower limit s(i).ts0 and the LOS time upper limit s(i).te0 (or greater than visibility time), or more specifically, when s(i).Tmin>s(i).te0−s(i).ts0, the visibility unit s(i) does not satisfy the conditions for the visibility time lower limit, and thus is pre-removed from the targets to be assigned with visibility.

The representative time s(i).tc is set as described above.

The process of generating the visibility units is described with reference to the example visibility information item No. 1 in FIG. 6.

Upon receiving the visibility information item, the visibility unit setter 21 sets, as described above, the visibility units s(1-1) and s(1-2) shown in FIG. 8, and sets the representative time 00:10 for the visibility unit s(1-1) and the representative time 00:30 for the visibility unit s(1-2). The visibility unit setter 21 sets, for the visibility units s(1-1) and s(1-2), the satellite identification information s(i).sat to 6-1 and the station identification information s(i).stn to 3-1. The visibility unit setter 21 sets the AOS time lower limit s(i).ts0 to 00:00 and the LOS time upper limit s(i).te0 to 00:40. When the visibility assignment conditions include the communication speed between the satellite 6-1 and the ground station 3-1 set to 80 Mbps, the visibility unit setter 21 sets, for example, the data transmission rate s(i).r to 80. When the visibility assignment conditions include the visibility time lower limit for communications of the satellite 6-1 specified to 20 minutes, the visibility unit setter 21 sets the visibility time lower limit s(i).Tmin to 20 minutes. The representative time is set as described above.

The visibility unit setter 21 also sets a weighting factor w for the visibility unit s(i).

The weighting factor w is set in the manner described below.

The visibility assignment device 1 is to maximize and effectively use the visibility time for each satellite 6. Thus, the AOS-LOS time optimization calculator 23, which is described later, to assign the longest possible visibility time T to each satellite 6 as an evaluation index. However, different satellites 6 use different visibility times, and the communication speed r differs between different combinations of the satellite 6 and the stations 3 and 4. Thus, the data volume that can be transmitted in the same visibility time T may vary, and the priority of the visibility time T may vary depending on the orbit position of the satellite 6 or the time slot. Thus, the weighting factor is set to each visibility unit s(i), and the difference in priority between the visibility times is reflected on the weighting factor. Based on this idea, the weighting factor s(i).w for each visibility unit s(i) is set as a multiplication of three coefficients as represented below.

$$s(i).w = w\_sat(s(i).sat) \times w\_stn(s(i).sat,s(i).stn) \times w\_t(s(i).sat,s(i).tc)$$

In the above formula, w_sat(s(i).sat) is a weighting factor reflecting the difference between visibility times used for the different satellites 6. For example, when the ratio of the used visibility time of a satellite A to the used visibility time of a satellite B is a:b, the visibility unit setter 21 sets the ratio of w_sat to, for example, 1/a:1/b.

In the formula, w_stn(s(i).sat, s(i).stn) is a weighting factor corresponding to a combination of each satellite 6 and a corresponding station 3 or 4. The weighting factor w_stn (s(i).sat, s(i).stn) is normally set to a greater value as the communication speed r is higher to reflect the difference in communication speed r corresponding to the combination of each satellite 6 and a corresponding station 3 or 4. The weight may be set to reflect other conditions. For example, when a specific satellite 6 preferentially uses a specific station 3 or 4, a greater weight may be set to the combination.

In the formula, w_t(s(i).sat, s(i).tc) is a weighting factor for the time slot of the visibility unit s(i) and the satellites 6.

The weighting factor w_stn(s(i).sat, s(i).stn) may be set by, for example, reading, from a table or functions including a weight for each combination of a satellite 6 and a station 3 or 4, the weighting factor corresponding to the combination.

Similarly, the weighting factor w_t(s(i).sat, s(i).tc) for each time slot may be set by, for example, reading, from a table or functions including a weight for each combination of a satellite 6 and the time slot of a visibility unit s(i), the weighting factor corresponding to the combination.

The visibility unit setter 21 outputs, to the visibility unit selector 22, a visibility unit list that lists the set visibility units s(i) and the associated attributes.

The visibility unit selector 22 acquires, from the visibility unit list provided from the visibility unit setter 21, combinations of the visibility units s(i) to be used and the visibility units s(i) to be unused. The visibility unit selector 22 outputs the acquired combinations to the AOS-LOS time optimization calculator 23, selects one of the combinations of the visibility units to be used based on the solution from the AOS-LOS time optimization calculator 23, and stores the combination into the storage 13.

The visibility unit selection performed by the visibility unit selector 22 is described in detail.

The visibility unit setter 21 sets multiple visibility units based on the visibility information. The visibility assignment involves determining combinations of the visibility units to be used and to be unused. The visibility unit selector 22 selects a combination from the combinations. Such selection of a combination based on specific references (evaluation indices) is generally referred to as a combinatorial optimization problem. In the combinatorial optimization problem, for a few combinations in total, an optimal solution can be acquired by calculating the evaluation index for each combination and comparing the evaluation indices. However, when the scale of the problem increases, or more specifically, the number of visibility units in the visibility assignment increases, the number of combinations explosively increases. In this case, such calculation for all possible combinations is impractical. Thus, various combinatorial optimization approaches for efficiently identifying a combination are developed and used. One of known examples is annealing (simulated annealing) described in Patent Literature 2.

To select a combination of the visibility units with the visibility unit selector 22, any of these combinatorial optimization approaches can be used.

In the present embodiment described below, the visibility unit selector 22 acquires an optimal or substantially optimal combination with a local search that is a relatively simple combinatorial optimization approach. The local search uses any initial solution and gradually changes the solution to sequentially acquire a better solution to reach an optimal or substantially optimal solution.

The use or non-use of the visibility unit s(i) is indicated with s(i).used. When the value of s(i).used is 0, the visibility unit s(i) is not used. When the value of s(i) is 1, the visibility unit s(i) is used. In other words, when s(i).used=1, the visibility unit s(i) is used, and when s(i).used=0, the visibility unit s(i) is not used.

The combination including all the visibility units s(i) specified to be used or unused is referred to as a solution below. A solution satisfying various constraints provided is referred to as a feasible solution.

In the present embodiment, the AOS-LOS time optimization calculator 23 optimizes the AOS time and the LOS time based on constraints provided, and determines whether the AOS time and the LOS time can be set (described in detail later). Thus, feasible has the same meaning as the AOS time and the LOS time being settable. Solutions not feasible are referred to as infeasible solutions.

The visibility unit selector 22 generates an initial solution. The initial solution is any solution that is feasible. For example, one of the visibility units may be set as s(i).used=1, and all the other visibility units may be set as s(j).used=0 (j≠i).

The visibility unit selector 22 lists solutions in the neighborhood of the current solution as next solution candidates. The current solution is equal to the initial solution at the start of the process. The solutions in the neighborhood of the current solution are acquired by changing only part of the current solution. Neighborhood can be defined variously. In this example, the two definitions for neighborhood, inversion and interchange, are described. Inversion indicates that the use or non-use of any one visibility unit for the current solution is inverted. For example, s(i).used=0 for any one visibility unit s(i) is changed to s(i).used=1, and s(i).used=1 for any one visibility unit s(i) is changed to s(i).used=0. When N visibility units are available, N solution candidates are included in inversion used for neighborhood.

Interchange indicates that use or non-use of two visibility units is interchanged. More specifically, the values of s(i).used and s(j).used of two visibility units s(i) and s(j) in which s(i).used≠s(j).used are interchanged. These two visibility units s(i) and s(j) are interchanged when the visibility units have a conflict relationship. The maximum number of solution candidates included in interchange used for neighborhood is the number acquired when two are selected from N visibility units. However, in reality, two visibility units satisfying the condition of s(i).used≠s(j).used and the condition that these visibility units have conflict are to be selected, and the number of solution candidates is thus less than the maximum number.

Although inversion and interchange are described as example definitions of neighborhood in the local search, the definitions of neighborhood may include other definitions. For example, the order of visibility units may be determined as an ascending order of the representative times, or the order may be interchanged to use the interchange of the order of the two visibility units as another definition of neighborhood.

The visibility unit selector 22 provides the combinations of the visibility units acquired in the above manner to the AOS-LOS time optimization calculator 23.

The visibility unit selector 22 specifies an optimal solution from the combinations of the visibility units as the visibility assignment result using information indicating whether the setting is allowed that is acquired through the process performed by the AOS-LOS time optimization calculator 23, the AOS and LOS times, and the evaluation index values.

The AOS-LOS time optimization calculator 23 illustrated in FIG. 3 formulates, as a linear programming problem, the AOS time and the LOS time for the visibility units s(i) included in the solution candidates input from the visibility unit selector 22, and solves the problem to acquire the AOS time and the LOS time through an optimization calculation. In the linear programming problem, all constraints are expressed in linear equations or inequalities with respect to optimization variables, and an evaluation index is expressed in a linear function with respect to optimization variables. When a solution satisfying the constraints is available for a linear programming problem, many existing general-purpose algorithms can be used to reliably acquire an optimal solution with a relatively short-time processing.

The AOS-LOS time optimization calculator 23 performs an optimization calculation of the AOS time and the LOS time for each of the solution candidates that are the combinations of the visibility units generated by the visibility unit selector 22. In the example described below, combinations of the visibility units with s(i).used=1 in the solution candidates is provided, or more specifically, combinations of the visibility units s(i) (i=1, ..., n) to be used are provided. The visibility units s(i) are arranged in the ascending order of the representative times. However, the arrangement is not limited to this order when the order interchange in the local search is performed. The AOS time and the LOS time of each visibility unit s(i) to be optimization variables are denoted with s(i).ts and s(i).te.

Figure 12:
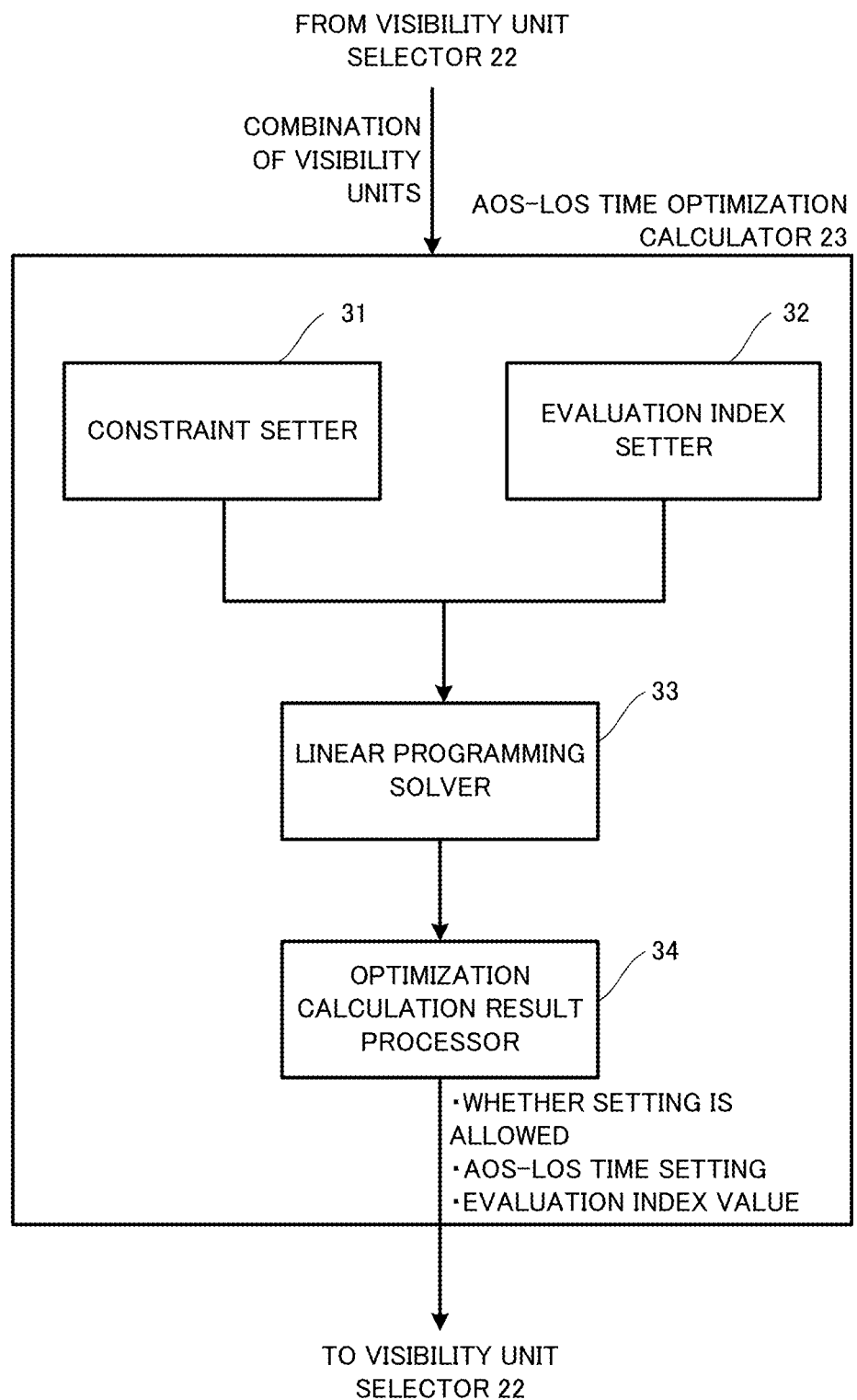
FIG. 12 is a diagram illustrating a functional configuration of an AOS-LOS time optimization calculator illustrated in FIG. 3.

As illustrated in FIG. 12, the AOS-LOS time optimization calculator 23 includes a constraint setter 31, an evaluation index setter 32, a linear programming solver 33, and an optimization calculation result processor 34.

The constraint setter 31 sets constraint expressions that define constraints for the combination of the visibility units provided from the visibility unit selector 22. The constraint setter 31 outputs the combination of the visibility units provided from the visibility unit selector 22 and the set constraint expressions to the linear programming solver 33.

The evaluation index setter 32 sets an evaluation index and additional constraint expressions for the combination of the visibility units provided from the visibility unit selector 22. The evaluation index setter 32 outputs the set evaluation index and the additional constraint expressions to the linear programming solver 33.

The linear programming solver 33 performs an optimization calculation on the provided combination of the visibility units using the constraint expressions and the evaluation index to acquire a feasible solution. The linear programming solver 33 determines whether the solution is feasible. When determining that the solution is infeasible, the linear programming solver 33 returns the determination as an output.

Upon receiving the output from the linear programming solver 33, the optimization calculation result processor 34 determines whether any feasible solution is available. When no feasible solution is available, or more specifically, the solution is infeasible, the optimization calculation result processor 34 simply outputs the determination indicating that the AOS-LOS time setting is not allowed. When the solution is feasible, the optimization calculation result processor 34 outputs the determination indicating that the AOS-LOS time setting is allowed, and also outputs the AOS time, the LOS time, and the evaluation index value corresponding to the optimal solution.

The constraints set by the constraint setter 31 illustrated in FIG. 12 are described in detail using mathematical formula.

The constraints on the lower and upper limits for the AOS time and the LOS time are first provided with the linear inequalities 1-1 and 1-2 below.

$$s(i).ts \geq s(i).ts0 \quad (1\text{-}1)$$

$$s(i).te \leq s(i).te0 \quad (1\text{-}2)$$

As described above, s(i).ts is the AOS time of the visibility unit s(i), s(i).te is the LOS time of the visibility unit s(i), s(i).ts0 is the visibility start time of the visibility unit s(i), and s(i).te0 is the visibility end time of the visibility unit s(i).

The constraint on the visibility time lower limit is provided using the linear inequality 2 below.

$$s(i).te - s(i).ts \geq s(i).\text{Tmin} \quad (2)$$

The constraint on the visibility interval is described. When two different stations among stations 3 and stations 4 are sequentially used for one satellite 6, the orientation of the antenna installed on the satellite 6 is changed or an installed device is switched, normally taking time for the switching. The time for switching is also taken between two different satellites 6 sequentially used for one station 3 or 4. Thus, the constraint on the switching time is provided with the linear inequality 3 below.

$$s(j).ts - s(i).te \geq \Delta \text{Tmin} \quad (3)$$

The above constraint is to be provided to the visibility units s(i) and s(j) when j>i and for the combinations of one satellite 6 and different stations 3 and 4, or more specifically, when s(j).sat=s(i).sat and s(j).stn≠s(i).stn, or for the combinations of different satellites 6 and one station 3 or 4, or more specifically, when s(j).sat≠s(i).sat and s(j).stn=s(i).stn. The lower limit ΔTmin of the visibility interval is pre-provided as a constant. In another example, as in s(i).Tmin, ΔTmin may vary between constraint expressions depending on the difference in the satellites 6 and the stations 3 and 4.

Setting of the evaluation index performed by the evaluation index setter 32 illustrated in FIG. 12 is described with reference to FIG. 13.

Figure 13:
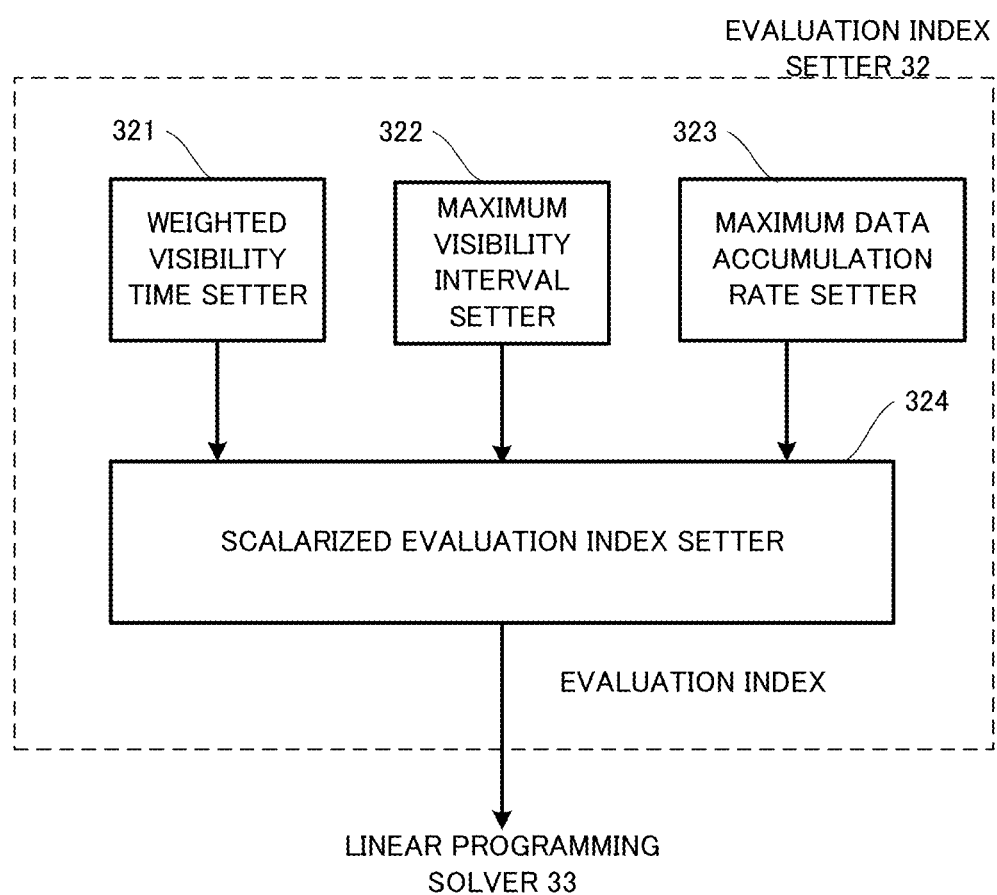
FIG. 13 is a diagram illustrating a functional configuration of an evaluation index setter illustrated in FIG. 12.

As illustrated in FIG. 13, the evaluation index setter 32 includes a weighted visibility time setter 321, a maximum visibility interval setter 322, a maximum data accumulation rate setter 323, and a scalarized evaluation index setter 324.

The weighted visibility time setter 321 sets an equality constraint in formula 4 (describe below) on the weighted visibility time for each satellite 6.

The maximum visibility interval setter 322 sets an inequality constraint in formula 5 (described below) on a maximum visibility interval for each satellite.

The maximum data accumulation rate setter 323 sets an inequality constraint in formula 6 (described below) on a data accumulation rate at the AOS time of each visibility unit, and sets an inequality constraint in formula 7 (described below) as a data volume balance condition between the visibilities.

In the example described below, parameters to be used include a value sath indicating the name of a satellite 6-h, a value d(sath) indicating the sum of the weighted visibility times for the satellite 6-h, a value Δt(sath) indicating the maximum visibility interval for the satellite 6-h, and a value u(sath) indicating the maximum data accumulation rate for the satellite 6-h. These parameters included in the evaluation indices are used after additional constraints are added as relational expressions between the AOS time and the LOS time of the visibility unit for each satellite 6.

The equality constraint in formula 4 below is set between the AOS time and the LOS time for the satellite 6-h as a sum of the weighted visibility times d(sath) for the satellite 6-h set as a parameter by the weighted visibility time setter 321 with the scalarized evaluation index setter 324.

$$d(\text{sath}) = \Sigma s(i).w \times (s(i).te - s(i).ts) \quad (4)$$

The sum Σ is used for the visibility unit s(i) when s(i).sat=sath.

The maximum visibility interval Δt(sath) for the satellite 6-h set as a parameter by the maximum visibility interval setter 322 with the scalarized evaluation index setter 324 is constrained with the inequality in formula 5 below.

$$s(j).ts - s(i).te \leq \Delta t(\text{sath}) \quad (5)$$

Formula 5 is set to all the combinations of the consecutive visibility units s(i) and s(j) when s(i).sat=s(j).sat=sath.

The maximum data accumulation rate u(sath) indicates the upper limit of the accumulation data rate for the data storage volume for the satellite 6-h. For example, when the satellite 6-h is an earth observation satellite, the satellite 6-h observes multiple observation target regions on the earth, and sequentially stores data sets resulting from the observation into the storage in the satellite 6-h. Thus, to use all the data sets resulting from the observation, the satellite 6-h is to transmit the data sets to the ground stations 3 or the data relay satellite 4 before the volume of data stored in the storage reaches the upper limit of the storage capacity of the storage.

Thus, the visibility assignment is to be performed to minimize the data accumulation rate for each satellite. The maximum data accumulation rate setter 323 thus uses a parameter s(i).u to represent the data accumulation rate in the AOS time for each visibility unit and sets the inequality constraint 6.

$$0 \leq s(i).0 \leq u(\text{sath}) \quad (6)$$

This formula is a constraint expression for all the visibility units when s(i).sat=sath.

The maximum data accumulation rate setter 323 further sets an inequality constraint in formula 7 below as a data volume balance condition for the visibility unit s(i).

$$s(i).u - s(i).r \times (s(i).te - s(i).ts)/v\max(\text{sath}) + s(j).\text{uinc} \leq s(j).u \quad (7)$$

Formula 7 is set to all the combinations of any two consecutive visibility units s(i) and s(j) when s(i).sat=s(j).sat=sath. In formula 7, vmax(sath) is the data capacity upper limit of the satellite sath, and s(j).uinc is an increment of an accumulation rate of the data stored in the storage in the satellite sath in the period from the AOS time for the visibility unit s(i) to the AOS time for the visibility unit s(j). These values are predetermined.

The scalarized evaluation index setter 324 sets the parameters set by the weighted visibility time setter 321, the maximum visibility interval setter 322, and the maximum data accumulation rate setter 323 to an evaluation index F represented in formula 8 below, where H is the total number of satellites 6 to be operated.

$$F = \{d(\text{sat1}), \ldots, d(\text{satH}), -\Delta t(\text{sat1}), \ldots, -\Delta t(\text{satH}), -u(\text{sat1}), \ldots, -u(\text{satH})\} \quad (8)$$

The weighted visibility time is to be maximized, whereas the maximum visibility interval and the maximum data accumulation rate are to be minimized. Thus, minus signs are added to the maximum visibility intervals and the maximum data accumulation rates to direct all the values to maximization.

The evaluation index F in formula 8 above is a vector value including 3×H parameters. However, the scalarized evaluation index setter 324 acquires the evaluation index by using the multi-objective linear programming and scalarizing the evaluation index F that is a vector value. Scalarization may be performed by any known approach.

The scalarized evaluation index setter 324 outputs the evaluation index acquired by scalarizing the evaluation index F to the linear programming solver 33.

The linear programming solver 33 illustrated in FIG. 12 performs an optimization calculation using the constraint expressions and the evaluation indices. Many general-purpose algorithms are known for linear programming problems, and a general-purpose solver can efficiently acquire an optimal solution.

The optimization calculation result processor 34 illustrated in FIG. 12 receives an optimal solution output from the linear programming solver 33. When the optimal solution output from the linear programming solver 33 is feasible, the optimization calculation result processor 34 extracts the AOS time and the LOS time from the optimization variables in the optimal solution, and outputs information indicating that the AOS-LOS time setting is allowed, the AOS time and the LOS time corresponding to the optimal solution, and the evaluation index value to the visibility unit selector 22. When the optimal solution is infeasible, the optimization calculation result processor 34 outputs the information indicating that the AOS-LOS time setting is not allowed.

The operation of the satellite operation system 100 is described.

When an operator of the satellite operation system 100 performs, on the visibility assignment device 1, a process for starting designing the visibility assignment plan of the satellites 6, the visibility assignment device 1 executes the visibility assignment program. The processor 11 then reads the orbit data about the data relay satellite 4 and the satellites 6 and the position data about the ground stations 3 from an orbit-position database (DB) included in the external server 19, generates visibility information illustrated in, for example, FIG. 4, and stores the information into the storage 13. The visibility information may be generated by the external server 19, received through the communication I/F 14 or the input-output I/F 15, and stored into the storage 13.

The processor 11 pre-captures the visibility assignment conditions from, for example, the external server 19, and stores the conditions in the storage 13.

The visibility unit setter 21 in the visibility assignment device 1 generates visibility units s(i) from the visibility information stored in the storage 13, and adds attributes such as satellite name s(i).sat to each of the generated visibility units s(i).

The visibility unit selector 22 sets combinations of the visibility units s(i).

Figure 14:
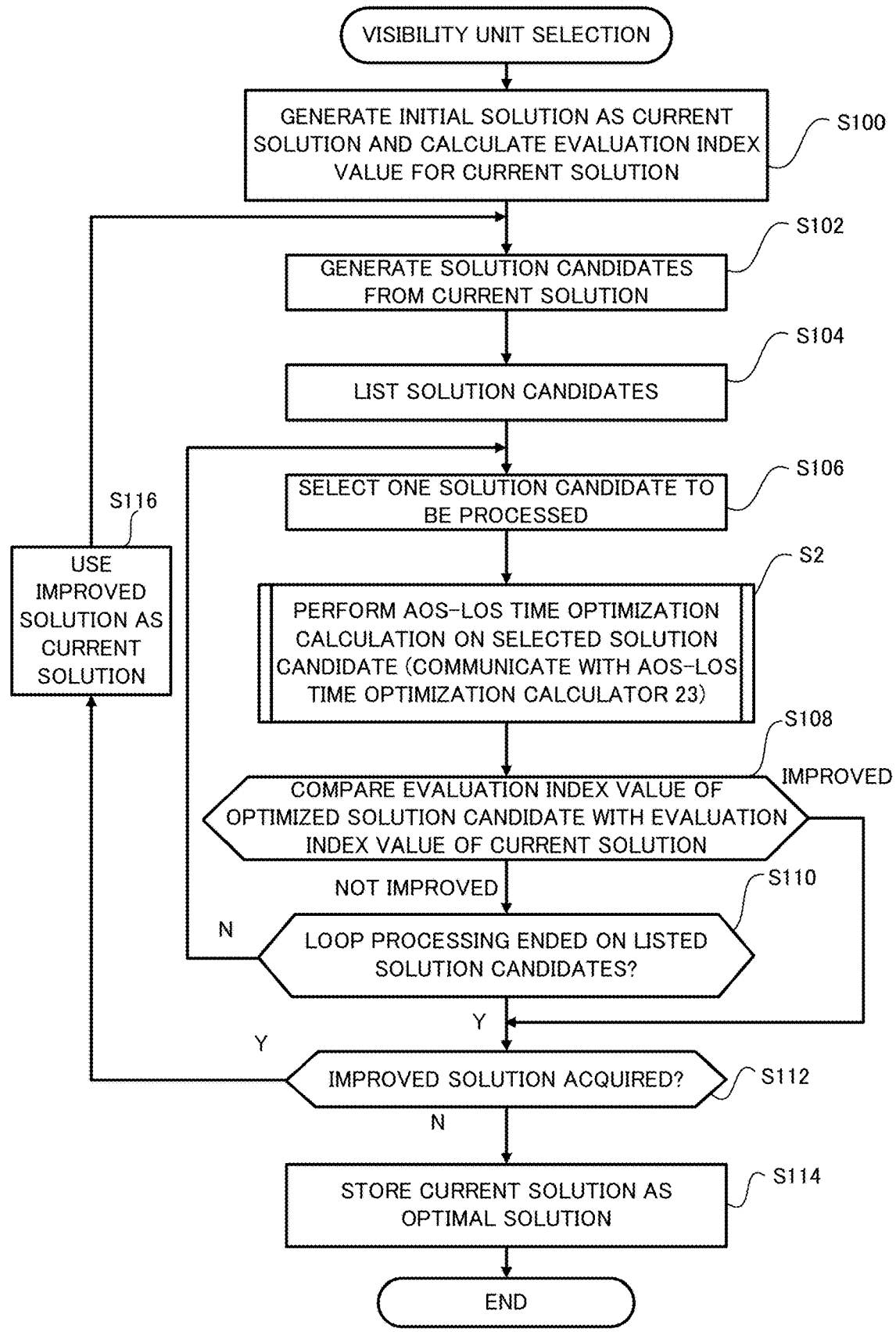
FIG. 14 is a flowchart of visibility unit selection performed by a visibility unit selector illustrated in FIG. 3.

The process performed by the visibility unit selector 22 is described in detail with reference to FIG. 14. FIG. 14 is a flowchart of the process performed by the visibility unit selector 22.

As illustrated in FIG. 14, the visibility unit selector 22 sets one of the combinations of the visibility units s(i) as an initial solution. The visibility unit selector 22 determines the set initial solution as a current solution. The visibility unit selector 22 then calculates an evaluation index value for the initial solution (step S100). For example, similarly to the processing to be performed in step S2, the visibility unit selector 22 performs the AOS-LOS time optimization calculation on the initial solution to acquire feasibility and an evaluation index value. None of the visibility unit combination may be set as the initial solution. In this case, the evaluation index value may be set to a sufficiently small value.

The visibility unit selector 22 then generates multiple solution candidates from the current solution (step S102).

The visibility unit selector 22 then lists the generated solution candidates (step S104).

The visibility unit selector 22 selects one of the solution candidates to be processed from the list (step S106).

Subsequently, in step S2, the visibility unit selector 22 stores the solution candidate to be processed selected in step S106, and outputs the solution candidate to the AOS-LOS time optimization calculator 23. The visibility unit selector 22 receives, from the AOS-LOS time optimization calculator 23, information indicating whether the solution candidate is a feasible solution, and when it is a feasible solution, also receives the AOS and LOS times and the evaluation index value. The visibility unit selector 22 stores the received information in association with the solution candidate. The processing performed in step S2 is described in detail later with reference to FIG. 15.

The visibility unit selector 22 then determines whether the solution candidate processed in the optimization calculation performed by the AOS-LOS time optimization calculator 23 is improved from the current solution by comparing the evaluation index values of the solution candidate and the current solution (step S108).

In step S108, when the evaluation index value of the solution candidate processed this time is greater than the evaluation index value of the current solution, or more specifically, when the evaluation index value is improved, the process advances to step S112. When the evaluation index value of the solution candidate processed this time is less than or equal to the evaluation index value of the current solution, or more specifically, when the evaluation index value is not improved, the process advances to step S110. When a feasible solution is not acquired, the process also advances to step S110.

In step S110, the visibility unit selector 22 determines whether the loop processing is complete on all the solution candidates listed in step S104. When the loop processing is complete (Y in step S110), the process advances to step S112. When the loop processing is not complete (N in step S110), the process returns to step S106.

In step S112, the visibility unit selector 22 determines whether an improved solution is acquired in the current loop processing.

When an improved solution is acquired (Y in step S112), the current solution is replaced with the improved solution (step S116), and the process advances to step S102. Other solution candidates are then generated, and the similar process is performed.

In contrast, when no improved solution is acquired in step S112, the current solution is stored into the storage 13 as the optimal solution (step S114).

As described above, when the visibility unit selector 22 determines that a solution improved from the current solution is acquired (an improved solution is acquired) in step S108, the process immediately exits from the loop and advances to step S112. This approach is generally referred to as first improvement. In contrast, instead of exiting from the loop immediately after determining that an improved solution is acquired, the visibility unit selector 22 may perform, before advancing to step S112, the loop processing on all the listed solution candidates and then select the solution with the greatest evaluation index value. This approach is generally referred to as best improvement. The optimal solution stored in step S114 is determined as a designed visibility assignment plan.

Figure 15:
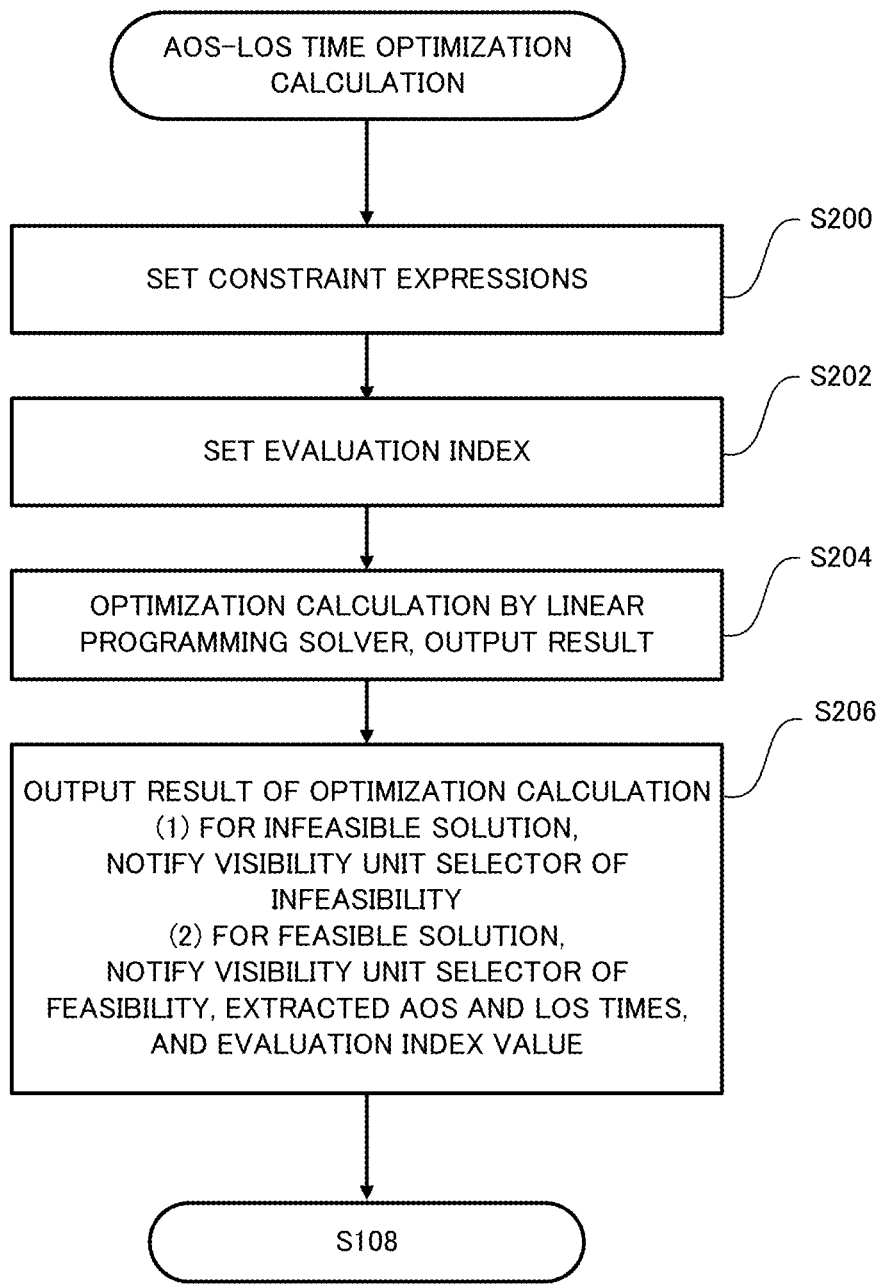
FIG. 15 is a flowchart of AOS-LOS time optimization calculation performed by the AOS-LOS time optimization calculator illustrated in FIG. 3.

The process performed by the AOS-LOS time optimization calculator 23 is described further with reference to FIG. 15. After step S106 in FIG. 14, the process in FIG. 15 is performed. The constraint setter 31 in the AOS-LOS time optimization calculator 23 first sets constraints with the linear programming solver 33 based on the visibility assignment conditions (step S200).

The evaluation index setter 32 then sets the evaluation index of the scalar value acquired from the evaluation index F represented in formula 8 with the linear programming solver 33, and also sets additional constraint expressions with the linear programming solver 33 (step S202).

In step S204, the linear programming solver 33 solves the linear programming problem on the combination of the visibility units provided from the visibility unit selector 22 using the set constraint expressions and evaluation index, and outputs the result.

Subsequently, in step S206, the optimization calculation result processor 34 notifies the visibility unit selector 22 of the output result. More specifically, when (1) the solution candidate is an infeasible solution based on the output result, the optimization calculation result processor 34 notifies the visibility unit selector 22 of the infeasibility of the solution candidate. When (2) the solution candidate is a feasible solution, the optimization calculation result processor 34 notifies the visibility unit selector 22 of (i) the feasibility of the provided solution candidate, (ii) the optimized AOS time and LOS time for each visibility unit s(i), and (iii) the evaluation index value.

The visibility unit selector 22 acquires an optimal solution for operating the satellites 6 based on the processing result from the AOS-LOS time optimization calculator 23, and stores the optimal solution into the storage 13.

The processor 11 transmits the optimal solution as a designed visibility assignment plan to the ground stations 3 and the data relay satellite control station 5 through the network 7. The data relay satellite control station 5 transmits the received visibility assignment plan to the data relay satellite 4.

The communication control apparatus CCA in each of the ground stations 3 and the data relay satellite 4 controls the antenna ANT based on the received visibility assignment plan, the orbit data, and the position data to track one of the satellites 6 to be operated. When communication is enabled with the satellite 6 by the tracking, the communication control apparatus CCA communicates with the satellite 6 through the antenna ANT to operate the satellite 6.

A known visibility assignment for satellites with priority level settings may assign more operation times to some satellites depending on the priority level setting for each satellite. More specifically, a satellite with a higher priority may be assigned with a longer operation time, or a satellite with a lower priority may be assigned with a shorter operation time.

Such a known assignment may not maximize or effectively use the visibility times of multiple satellites when the visibility times for the satellites overlap. The determining priority levels to be set to the satellites is difficult, and may involve trial and error or impose a heavy burden on the operator.

In contrast, the visibility assignment device 1 described above eliminates setting priority levels to the satellites and can automatically design a constantly optimized visibility assignment plan for multiple satellites using antennas in the multiple ground stations 3 and the data relay satellite 4. This solves the issues described above. When the visibility times for multiple satellites overlap, each visibility time is divided into short time periods. In this case, the visibility assignment device 1 can avoid an increase of combinations of multiple antennas and multiple satellites. This allows designing of an optimized visibility assignment plan for multiple satellites using antennas in the multiple ground stations 3 and the data relay satellite 4 within a practical processing time.

The satellite operation system 100 acquires an optimal solution including multiple visibility units s(i) each including the optimum AOS time and LOS time. The visibility assignment plan designing program allows division of a relatively long visibility time for use, as shown in FIGS. 10 and 11. The system can thus design a visibility assignment plan that maximizes and effectively uses the visibility times of the satellites 6, also allowing flexible, efficient use of the visibility times.

The evaluation index setter 32 in the AOS-LOS time optimization calculator 23 performs optimization through linear programming using an evaluation index acquired by scalarizing the evaluation index F that includes multiple parameters indicating different phenomena. Thus, the visibility assignment plan designed by the visibility assignment device 1 allows the AOS time and the LOS time to be acquired to reflect, in a detailed and well-balanced manner, the attributes of the satellites 6 and the stations 3 and 4, or more specifically, different indices such as the communication speed, the volume of data that can be communicated, the weighted visibility time, the maximum visibility interval, and the maximum data accumulation rate.

Although the satellite operation system 100 includes the single visibility assignment device 1 in FIG. 1, the satellite operation system 100 may include multiple visibility assignment devices 1.

Although the visibility unit selector 22 determines an optimal solution with first improvement in FIG. 14, the visibility unit selector 22 may determine an optimal solution with best improvement. For best improvement, instead of performing step S108 in FIG. 14, the visibility unit selector 22 compares the evaluation index value of the current solution with the greatest evaluation index value among the values acquired for the solution candidates in step S112.

Although the visibility information is generated in the unit of a day in the embodiment, the visibility information may be generated in other units, such as an hour, a week, or a month.

The AOS-LOS time optimization calculator 23 may solve the problem with a solver corresponding to an optimization approach other than the linear programming. For example, using the same constraints, the AOS-LOS time optimization calculator 23 may efficiently acquire an optimal solution with quadratic programming using the evaluation index as a quadratic function of variables for optimization.

In the process in FIG. 14, the calculation continues while the process keeps acquiring improved solutions. In some embodiments, a threshold may be preset for, for example, the calculation time or the number of times of repetition, and the calculation may be ended when exceeding the threshold. In this case as well, a relatively improved solution can be acquired. Thus, a sufficiently efficient visibility assignment result is expected. The term greatest used in the embodiment may be switched to, for example, least depending on the process of the visibility assignment plan designing program to provide an optimal solution.

In the embodiment, the AOS-LOS time optimization calculator 23 calculates an evaluation index value, and the visibility unit selector 22 uses the evaluation index value provided from the AOS-LOS time optimization calculator 23. However, the visibility unit selector 22 may calculate the evaluation index value. In this case, the AOS-LOS time optimization calculator 23 provides information to be used to calculate the evaluation index value to the visibility unit selector 22. The visibility unit selector 22 performs evaluation by simply comparing the two solutions. Thus, unlike the evaluation index used in the AOS-LOS time optimization calculator 23, multiple evaluation indices may be separately set and used. For example, the vector evaluation index F in Formula 8 may be used without being scalarized. The processes to be performed by the visibility unit selector 22 and the AOS-LOS time optimization calculator 23 may be shared as appropriate.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

In the above embodiment of the present disclosure, the visibility unit setter 21, the visibility unit selector 22, and the AOS-LOS time optimization calculator 23 are all implemented on the same computer, but one or more of these may be implemented on another computer but may function in the same manner. For example, when the visibility unit setter 21 is implemented on a computer different from a computer on which the visibility unit selector 22 and the AOS-LOS time optimization calculator 23 are implemented, the set visibility unit list may be stored in the server 19, and accessed from the computer through the communication interface 14.

The computer may function as the satellite visibility assignment device, or a program for implementing the above visibility assignment method may be recorded on a non-transitory recording medium for distribution.

REFERENCE SIGNS LIST

1 Visibility assignment device
2 Operation center
3 (3-1, 3-2) Ground station
4 Data relay satellite
5 Data relay satellite control station
6 (6-1 to 6-4) Satellite
7 Network
11 Processor
12 Memory
13 Storage
14 Communication interface
15 Input-output interface
19 Server
21 Visibility unit setter
22 Visibility unit selector
23 AOS-LOS time optimization calculator
31 Constraint setter
32 Evaluation index setter
33 Linear programming solver
34 Optimization calculation result processor
100 Satellite operation system
321 Weighted visibility time setter
322 Maximum visibility interval setter
323 Maximum data accumulation rate setter
324 Scalarized evaluation index setter

The invention claimed is:

1. A satellite visibility assignment device for assigning a visibility time of one or more stations to perform a tracking control operation on one or more satellites, the satellite visibility assignment device comprising processing circuitry configured as:
   a visibility unit setter;
   a visibility unit selector; and
   an optimization calculator,
   wherein
   the visibility unit setter sets, based on visibility information, visibility units each including a combination of a satellite and a station to communicate with the satellite, a lower limit of a visibility start time, and an upper limit of a visibility end time,
   the visibility unit selector sets one or more combinations of the visibility units set by the visibility unit setter,
   the optimization calculator determines whether the visibility start time and the visibility end time are settable for each of the one or more combinations of the visibility units within a range satisfying at least one constraint of a visibility time, a visibility interval, the lower limit of the visibility start time, or the upper limit of the visibility end time, and calculates the visibility start time and the visibility end time through an optimization calculation when the visibility start time and the visibility end time are settable, and
   the visibility unit selector selects, from the set one or more combinations of the visibility units, a combination of the visibility units to be used based on determination of the optimization calculator as to whether the visibility start time and the visibility end time are settable and based on the visibility start time and the visibility end time set when the visibility start time and the visibility end time are determined to be settable.

2. The satellite visibility assignment device according to claim 1, wherein
   the visibility unit setter generates a plurality of visibility units based on at least one visibility, and sets a different representative time for each of the plurality of visibility units, and
   each of the visibility unit selector and the optimization calculator arranges the plurality of visibility units in order of representative times.

3. The satellite visibility assignment device according to claim 2, wherein
   the optimization calculator calculates the visibility start time and the visibility end time to maximize an evaluation index including at least one of a weighted visibility time being a sum of products of a weighting factor for each visibility unit and the visibility time of each satellite, a maximum visibility interval for each satellite, or a maximum data accumulation rate for each satellite, and
   the visibility unit selector selects a combination of visibility units maximizing the evaluation index.

4. The satellite visibility assignment device according to claim 3, wherein
   the optimization calculator sets a linear programming problem including the visibility start time and the visibility end time of each of the visibility units as optimization variables, and solves the linear programming problem to calculate the visibility start time and the visibility end time.

5. A satellite operation system, comprising:
the satellite visibility assignment device according to claim 3, the satellite visibility assignment device further including a transmitter to transmit a visibility assignment result selected by the visibility unit selector; and
a station to receive the visibility assignment result transmitted from the transmitter, to drive an antenna in a time slot including a period from the visibility start time to the visibility end time of the satellite based on the received visibility assignment result, and to track the satellite.

6. The satellite operation system according to claim 5, wherein
the station includes
a ground station to communicate with the satellite, and
a relay satellite to relay communications between the satellite and the ground station.

7. The satellite visibility assignment device according to claim 2, wherein
the optimization calculator sets a linear programming problem including the visibility start time and the visibility end time of each of the visibility units as optimization variables, and solves the linear programming problem to calculate the visibility start time and the visibility end time.

8. A satellite operation system, comprising:
the satellite visibility assignment device according to claim 2, the satellite visibility assignment device further including a transmitter to transmit a visibility assignment result selected by the visibility unit selector; and
a station to receive the visibility assignment result transmitted from the transmitter, to drive an antenna in a time slot including a period from the visibility start time to the visibility end time of the satellite based on the received visibility assignment result, and to track the satellite.

9. The satellite operation system according to claim 8, wherein
the station includes
a ground station to communicate with the satellite, and
a relay satellite to relay communications between the satellite and the ground station.

10. The satellite visibility assignment device according to claim 1, wherein
the optimization calculator calculates the visibility start time and the visibility end time to maximize an evaluation index including at least one of a weighted visibility time being a sum of products of a weighting factor for each visibility unit and the visibility time of each satellite, a maximum visibility interval for each satellite, or a maximum data accumulation rate for each satellite, and
the visibility unit selector selects a combination of visibility units maximizing the evaluation index.

11. The satellite visibility assignment device according to claim 10, wherein
the optimization calculator sets a linear programming problem including the visibility start time and the visibility end time of each of the visibility units as optimization variables, and solves the linear programming problem to calculate the visibility start time and the visibility end time.

12. A satellite operation system, comprising:
the satellite visibility assignment device according to claim 10, the satellite visibility assignment device further including a transmitter to transmit a visibility assignment result selected by the visibility unit selector; and
a station to receive the visibility assignment result transmitted from the transmitter, to drive an antenna in a time slot including a period from the visibility start time to the visibility end time of the satellite based on the received visibility assignment result, and to track the satellite.

13. The satellite operation system according to claim 12, wherein
the station includes
a ground station to communicate with the satellite, and
a relay satellite to relay communications between the satellite and the ground station.

14. The satellite visibility assignment device according to claim 1, wherein
the optimization calculator sets a linear programming problem including the visibility start time and the visibility end time of each of the visibility units as optimization variables, and solves the linear programming problem to calculate the visibility start time and the visibility end time.

15. A satellite operation system, comprising:
the satellite visibility assignment device according to claim 14, the satellite visibility assignment device further including a transmitter to transmit a visibility assignment result selected by the visibility unit selector; and
a station to receive the visibility assignment result transmitted from the transmitter, to drive an antenna in a time slot including a period from the visibility start time to the visibility end time of the satellite based on the received visibility assignment result, and to track the satellite.

16. The satellite operation system according to claim 15, wherein
the station includes
a ground station to communicate with the satellite, and
a relay satellite to relay communications between the satellite and the ground station.

17. A satellite operation system, comprising:
the satellite visibility assignment device according to claim 1, the satellite visibility assignment device further including a transmitter to transmit a visibility assignment result selected by the visibility unit selector; and
a station to receive the visibility assignment result transmitted from the transmitter, to drive an antenna in a time slot including a period from the visibility start time to the visibility end time of the satellite based on the received visibility assignment result, and to track the satellite.

18. The satellite operation system according to claim 17, wherein
the station includes
a ground station to communicate with the satellite, and
a relay satellite to relay communications between the satellite and the ground station.

19. A satellite visibility assignment method, comprising:

setting, based on visibility information, visibility units each including a combination of a satellite and a station to communicate with the satellite, a lower limit of a visibility start time, and an upper limit of a visibility end time;

setting one or more combinations of the set visibility units;

determining whether the visibility start time and the visibility end time are settable for each of the set one or more combinations of the visibility units within a range satisfying at least one constraint of a visibility time, a visibility interval, the lower limit of the visibility start time, or the upper limit of the visibility end time, and calculating the visibility start time and the visibility end time through an optimization calculation when the visibility start time and the visibility end time are settable; and selecting, from the set one or more combinations of the visibility units, a combination of the visibility units to be used based on determination as to whether the visibility start time and the visibility end time are settable and based on an evaluation index value acquired based on the visibility start time and the visibility end time set when the visibility start time and the visibility end time are determined to be settable.

20. A non-transitory computer-readable recording medium storing a program, the program causing a computer to perform operations comprising:

setting, based on visibility information, visibility units each including a combination of a satellite and a station to communicate with the satellite, a lower limit of a visibility start time, and an upper limit of a visibility end time;

setting one or more combinations of the set visibility units;

determining whether the visibility start time and the visibility end time are settable for each of the set one or more combinations of the visibility units within a range satisfying at least one constraint of a visibility time, a visibility interval, the lower limit of the visibility start time, or the upper limit of the visibility end time, and calculating the visibility start time and the visibility end time through an optimization calculation when the visibility start time and the visibility end time are settable; and selecting, from the set one or more combinations of the visibility units, a combination of the visibility units to be used based on determination as to whether the visibility start time and the visibility end time are settable and based on an evaluation index value acquired based on the visibility start time and the visibility end time set when the visibility start time and the visibility end time are determined to be settable.

* * * * *